US010574788B2

(12) United States Patent
Velusamy

(10) Patent No.: US 10,574,788 B2
(45) Date of Patent: Feb. 25, 2020

(54) SYSTEM FOR DATA TRANSFER BASED ON ASSOCIATED TRANSFER PATHS

(71) Applicant: eBay Inc., San Jose, CA (US)

(72) Inventor: Lakshmanan Velusamy, Bellevue, WA (US)

(73) Assignee: eBay Inc., San Jose, CA (US)

(*) Notice: Subject to any disclaimer, the term of this patent is extended or adjusted under 35 U.S.C. 154(b) by 428 days.

(21) Appl. No.: 15/244,139

(22) Filed: Aug. 23, 2016

(65) Prior Publication Data
US 2018/0063281 A1 Mar. 1, 2018

(51) Int. Cl.
H04L 29/08 (2006.01)
H04L 29/06 (2006.01)
H04L 12/869 (2013.01)
H04L 12/721 (2013.01)

(52) U.S. Cl.
CPC .......... *H04L 67/327* (2013.01); *H04L 47/60* (2013.01); *H04L 67/108* (2013.01); *H04L 67/42* (2013.01); *H04L 45/124* (2013.01)

(58) Field of Classification Search
CPC ..... H04L 67/327; H04L 67/108; H04L 47/60; H04L 67/42; H04L 45/122
USPC .................................................. 709/223, 238
See application file for complete search history.

(56) References Cited

U.S. PATENT DOCUMENTS

| 5,751,970 | A  | * | 5/1998  | Bournas ............. H04L 29/06  370/470 |
| 5,951,707 | A  | * | 9/1999  | Christensen ....... H03M 13/091  370/466 |
| 6,032,192 | A  | * | 2/2000  | Wegner ............... H04M 15/00  709/206 |
| 6,700,902 | B1 | * | 3/2004  | Meyer ................. H04L 1/0007  370/329 |
| 6,938,095 | B2 | * | 8/2005  | Basturk ............... G06F 9/542  370/351 |
| 7,187,941 | B2 | * | 3/2007  | Siegel ................. H04L 45/00  455/11.1 |
| 7,761,514 | B2 | * | 7/2010  | Popescu .............. H04L 12/185  370/255 |
| 7,822,028 | B1 | * | 10/2010 | Rimmer ............... H04L 45/00  370/231 |
| 8,514,718 | B2 | * | 8/2013  | Zijst .................... H04L 47/125  370/238 |
| 8,548,918 | B1 | * | 10/2013 | Amidon .............. G06Q 20/123  705/50 |
| 8,560,634 | B2 | * | 10/2013 | Twitchell, Jr. ....... H04L 45/586  709/217 |
| 9,197,696 | B1 |   | 11/2015 | Jakatdar et al. |
| 2001/0034793 | A1 | * | 10/2001 | Madruga ............ H04L 12/1854  709/238 |
| 2002/0052751 | A1 | * | 5/2002  | Ebata ................. G06Q 10/08355  705/417 |

(Continued)

*Primary Examiner* — Daniel C. Murray

(74) *Attorney, Agent, or Firm* — Schwegman Lundberg & Woessner, P.A.

(57) ABSTRACT

Methods, systems, and apparatus for transferring data are described. A list of recipients of the data is obtained and one or more paths to each recipient of the data is determined. An overall transfer cost of each path is computed and one or more transfer paths for each recipient are selected based on a corresponding overall transfer cost. Then a packet of data is transferred to a client device associated with each transfer path.

20 Claims, 13 Drawing Sheets

(56) References Cited

U.S. PATENT DOCUMENTS

| | | | | |
|---|---|---|---|---|
| 2002/0094780 A1* | 7/2002 | Payton | H04L 41/046 | 455/41.2 |
| 2002/0178231 A1* | 11/2002 | Matsa | H04L 29/06 | 709/206 |
| 2003/0018694 A1* | 1/2003 | Chen | G06F 8/60 | 709/200 |
| 2003/0051236 A1* | 3/2003 | Pace | G06F 8/60 | 717/177 |
| 2003/0101213 A1* | 5/2003 | Wright | H04L 29/06 | 709/203 |
| 2003/0158883 A1* | 8/2003 | Drudis | G06F 9/546 | 718/102 |
| 2004/0105118 A1* | 6/2004 | El-Gazzar | H04L 12/5692 | 358/1.15 |
| 2004/0184071 A1* | 9/2004 | Garg | G06F 3/1205 | 358/1.15 |
| 2005/0060426 A1* | 3/2005 | Samuels | H04L 41/12 | 709/238 |
| 2005/0102416 A1* | 5/2005 | Miller-Smith | H04L 1/1809 | 709/238 |
| 2006/0083238 A1* | 4/2006 | Lee | H04L 47/724 | 370/389 |
| 2006/0245360 A1* | 11/2006 | Ensor | H04L 29/12207 | 370/238 |
| 2007/0008891 A1* | 1/2007 | Kline | H04L 12/2803 | 370/238 |
| 2008/0117892 A1* | 5/2008 | Bahr | H04L 45/12 | 370/351 |
| 2009/0327917 A1* | 12/2009 | Aaron | H04L 1/0009 | 715/751 |
| 2010/0262709 A1* | 10/2010 | Hiie | H04L 12/1827 | 709/231 |
| 2010/0318678 A1* | 12/2010 | Chaturvedi | H04L 45/00 | 709/238 |
| 2011/0034121 A1 | 2/2011 | Ng et al. | | |
| 2011/0145437 A1* | 6/2011 | Niven-Jenkins | H04L 29/12783 | 709/238 |
| 2012/0311173 A1* | 12/2012 | Agarwal | H04L 43/0829 | 709/231 |
| 2013/0216035 A1* | 8/2013 | Yakman | H04L 45/00 | 379/211.01 |
| 2013/0311602 A1 | 11/2013 | Rosenblatt et al. | | |
| 2014/0344420 A1 | 11/2014 | Rjeili et al. | | |
| 2017/0251048 A1* | 8/2017 | Brunet | H04L 67/06 | |

* cited by examiner

US 10,574,788 B2

SYSTEM FOR DATA TRANSFER BASED ON ASSOCIATED TRANSFER PATHS

TECHNICAL FIELD

The present application relates generally to transferring data, and more specifically, in one example, to routing data to a device based on consumed transfer resources.

BACKGROUND

Data is often shared between a variety of servers, client devices, and the like. The data may originate from a server or a client device. The same data may be transferred to a plurality of devices, either contemporaneously or at different times. Each data transfer is typically associated with an overall transfer cost based, for example, on the type of communication link, the type of telecommunication service, the data transfer cost, the data transfer rate, and the like. Different costs may be associated with cellular data services, cable television Internet services, WiFi, Digital Subscriber Loop (DSL) services, and the like.

BRIEF DESCRIPTION OF THE DRAWINGS

Some embodiments are illustrated by way of example and not limitation in the figures of the accompanying drawings, in which.

DETAILED DESCRIPTION

Figure 1A:
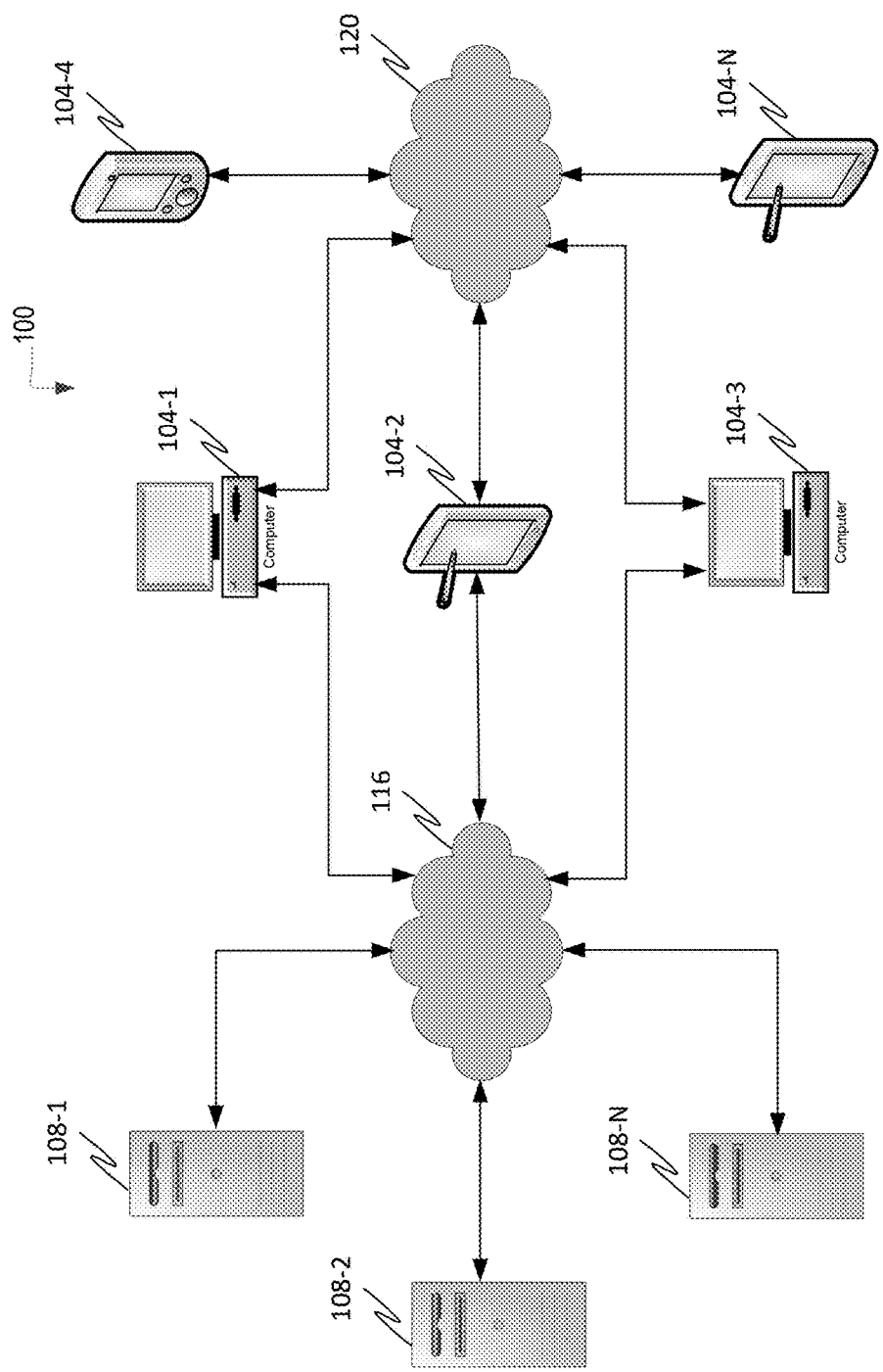
FIG. 1A is a block diagram of an example system for transferring data, in accordance with an example embodiment.

In the following detailed description of example embodiments of the invention, reference is made to specific examples by way of drawings and illustrations. These examples are described in sufficient detail to enable those skilled in the art to practice the invention, and serve to illustrate how the invention may be applied to various purposes or embodiments. Other example embodiments of the invention exist and are within the scope of the invention, and logical, mechanical, electrical, and other changes may be made without departing from the scope or extent of the present invention. Features or limitations of various embodiments of the invention described herein, however essential to the example embodiments in which they are incorporated, do not limit the invention as a whole, and any reference to the invention, its elements, operation, and application do not limit the invention as a whole but serve only to define these example embodiments. The following detailed description does not, therefore, limit the scope of the invention, which is defined only by the appended claims.

Generally, methods, apparatus, and systems for transferring data are disclosed. The path chosen for transferring the data and the devices traversed in transferring the data (if any) may be based on an overall transfer cost. The transfer cost may include a cost for transferring the data over a network of a service provider, an amount of time needed to transfer the data, an amount of available data transfer capacity, and the like. The transfer may be optimized based on various optimization criteria, such as minimal network cost, minimal transfer time, minimal cost for a particular participant of the data transfer, minimal cost for a particular recipient of the transfer, and the like. The data may be transferred using a number of modes: 1) pass-through; 2) data segmentation and re-assembly; 3) distributed segmentation and re-assembly; or 4) any combination thereof, as described more fully below.

Data Transferred Via a Pass-Through Client Device

In one example embodiment, data transferred to a client device is transferred via another client device (known herein as a pass-through client device). The transfer via the pass-through client device is characterized by a lower transfer cost than a transfer that bypasses the pass-through client device. In one example embodiment, the data may sequentially pass through multiple pass-through client devices, may be segmented into different portions that pass through different pass-through client devices in parallel, or any combination thereof.

Data Segmentation and Reassembly

In one example embodiment, data to be transferred to a plurality of client devices may be split into portions, with each portion being transferred to one of the client devices. Each client device then sends the received portion of data to another client device such that the entire content package can be recreated (at each client device) from the received portions.

Distributed Data Segmentation and Reassembly

In one example embodiment, the data is segmented into portions as described above, and the size of each portion is based on the overall transfer cost. For example, if a transfer of data to a first client device is twice as expensive as the transfer of data to a second client device, the portion of data transferred to the second client device may be specified to be larger than the portion of data transferred to the first client device. The transfer cost may include, for example, data transfer rates specified by a telecommunications service provider, available data transfer capacity, and the like.

Transfer Cost

Transfer cost may be based on a variety of factors. In one example embodiment, the transfer cost is based on an amount of available data capacity associated with a cellular line or similar communication link. For example, telecommunication service providers may allow a client device to transfer a specified amount of data each month before additional charges are incurred. The amount of available data transfer capacity may be obtained, for example, by automatically sending a text message to the telecommunications carrier and receiving a text message from the carrier that indicates the available data transfer capacity for the current time period. If the data transfer will exceed the available data transfer capacity, the data transfer may be denied. If the data transfer will not exceed the available data capacity, the cost of the data transfer may be determined based on the cost specified by the telecommunications carrier, such as the cost specified by a cellular data plan. For example, if 10 GB of data costs $30.00US and the data transfer is one megabyte (MB), the data transfer cost is $0.003. If exceeding the available data capacity is allowed, but will incur an additional cost, the additional cost can be included in the transfer cost calculation. In addition, rules may be defined by a user to, for example, forbid exceeding the available data capacity.

In one example embodiment, a search for requested data that resides on a server, client device, and the like may consider the overall transfer cost of the data. The search may be conducted by utilizing an index that identifies the location(s) of each data content item, by probing client devices and servers for a copy of the data content item, or any combination thereof. If the data content is available at more than one location, the location associated with, for example, the least expensive transfer cost may be selected for retrieval of the data content.

Optimization Criteria

The transfer may be optimized based on various optimization criteria, such as minimal network cost, minimal transfer time, minimal cost for a particular participant of the data transfer, minimal cost for a particular recipient of the transfer, an amount of available data transfer capacity, and the like.

FIG. 1A is a block diagram of an example system 100 for transferring data, in accordance with an example embodiment. In one example embodiment, the system 100 may comprise client devices 104-1, . . . 104-N (known collectively as client device 104 hereinafter), servers 108-1, . . . 108-N (known collectively as server 108 hereinafter), a first network 116, and a local area network (LAN) 120.

Each client device 104 may be a personal computer (PC), a tablet computer, a mobile phone, a telephone, a personal digital assistant (PDA), a wearable computing device (e.g., a smartwatch), or any other appropriate computer device. In one example embodiment, a user interface module may include a web browser program and/or an application, such as a mobile application. The client device 104 may be used by a user, such as a customer, to initiate communications for transferring data. Although a detailed description is only illustrated for the client device 104, it is noted that other user devices may have corresponding elements with the same functionality. The client device 104 may receive a query for information or a request to transfer data, the request being received from a user via an input device such as a keyboard, touchscreen, microphone, mouse, electronic pen, and the like.

The first network 116 may be a local area network (LAN), a wireless network, a metropolitan area network (MAN), a wide area network (WAN), a wireless network, a network of interconnected networks, the public switched telephone network (PSTN), an electrical power-based network (such as the X.10 protocol), and the like. The local area network 120 may be a local area network (LAN), a wireless network, a part of a metropolitan area network (MAN), a part of a wide area network (WAN), a wireless network, a network of interconnected networks, a part of the public switched telephone network (PSTN), an electrical power-based network (such as the X.10 protocol), and the like. Communication links include, but are not limited to, WiFi (e.g., IEEE 802.11), Bluetooth, Universal Serial Bus (USB), and the like. In one example embodiment, the first network 116, the local area network 120, or both may comprise one or more routers or device switches (not shown).

Figure 1B:
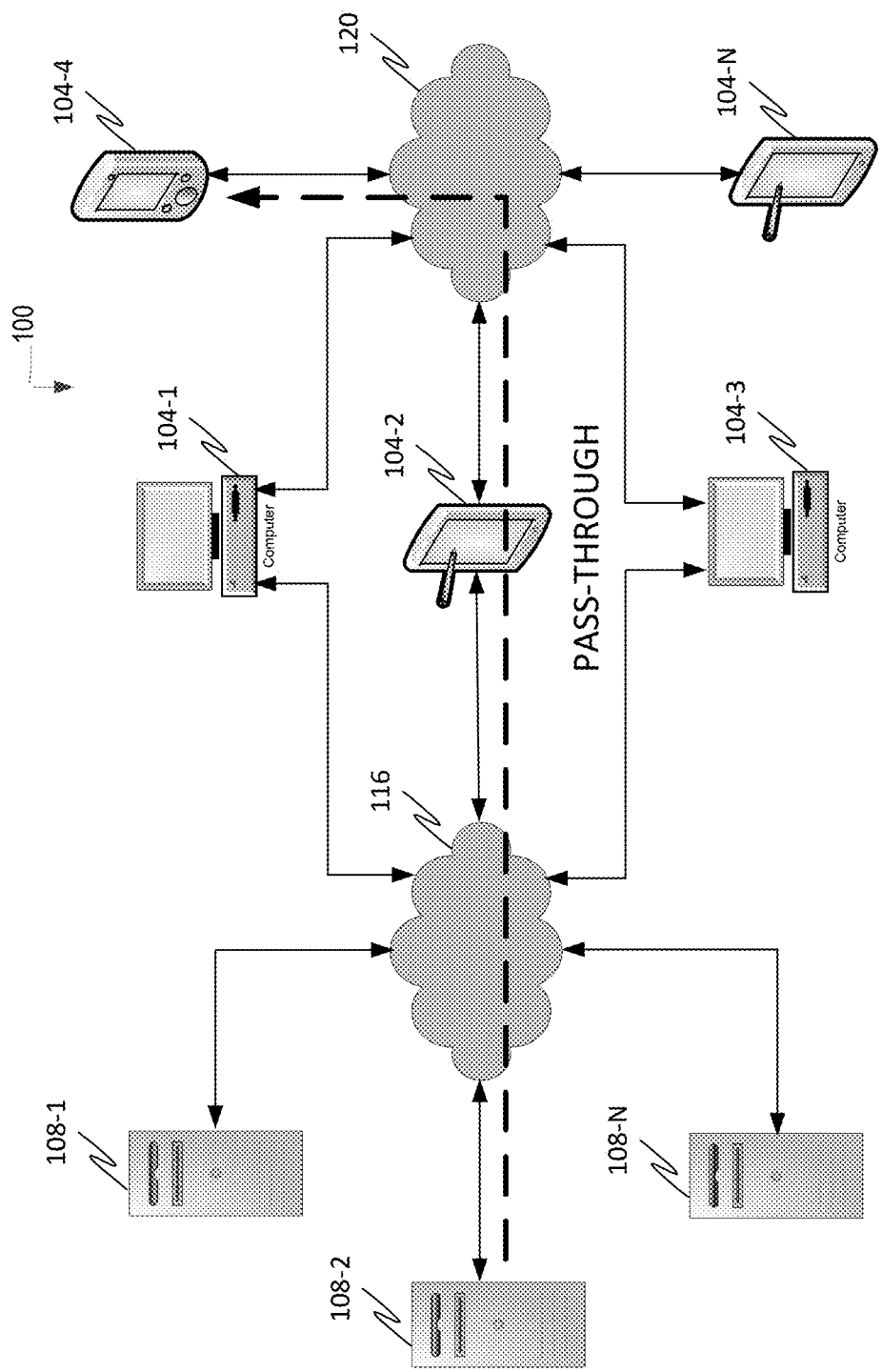
FIG. 1B is a block diagram of the example system illustrating a data transfer using a pass-through mode, in accordance with an example embodiment.

FIG. 1B is a block diagram of the example system 100 illustrating a data transfer using the pass-through mode, in accordance with an example embodiment. In the example of FIG. 1B, data from an entity, such as the server 108-2, is transferred to the client device 104-4 via the client device 104-2. The path via the client device 104-2 has an overall lower transfer cost than a path that bypasses the client device 104-2.

Figure 1C:
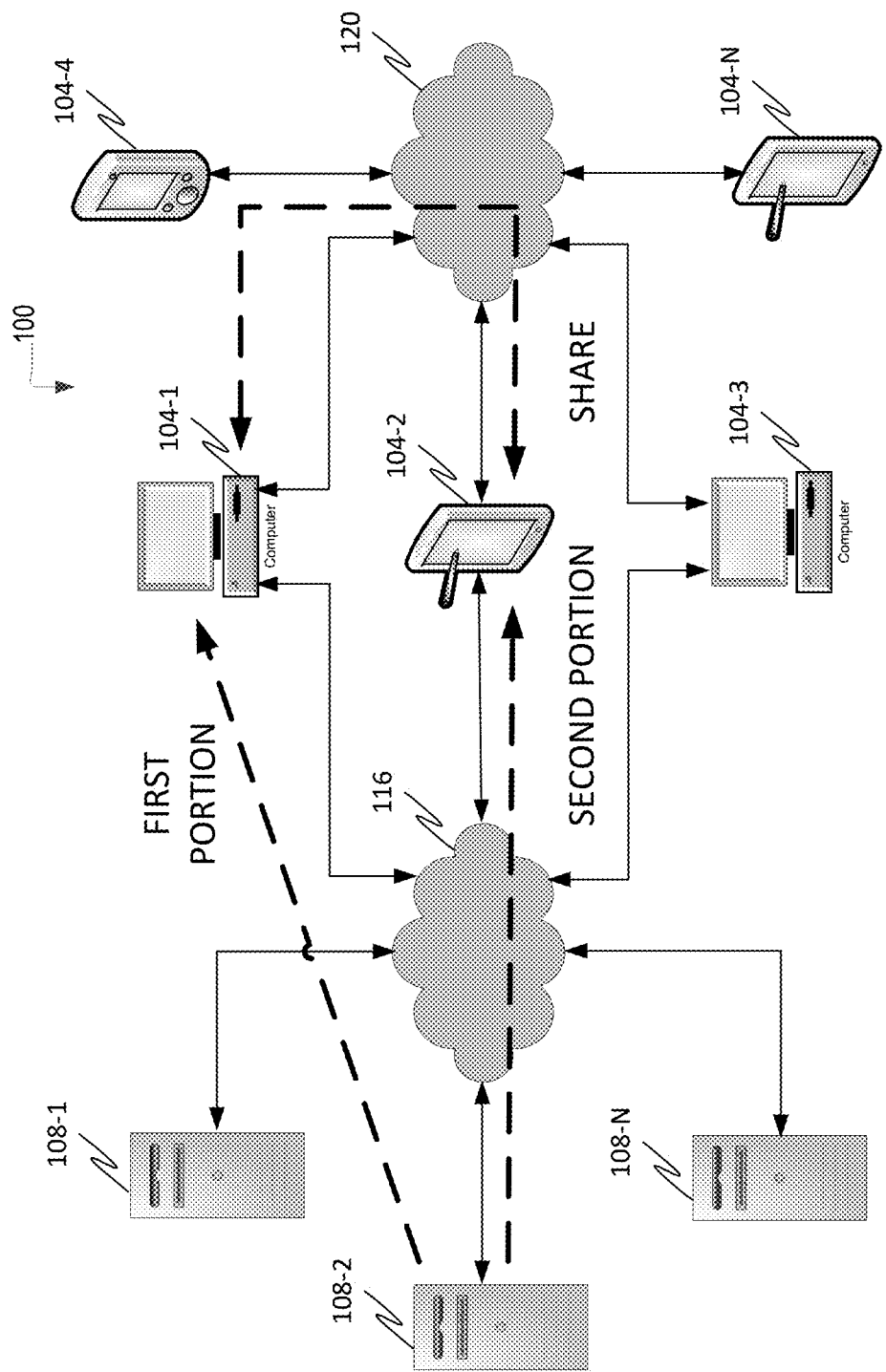
FIG. 1C is a block diagram of the example system illustrating a data transfer using a segmentation and reassembly mode, in accordance with an example embodiment.

FIG. 1C is a block diagram of the example system 100 illustrating a data transfer using the segmentation and reassembly mode, in accordance with an example embodiment. In the example of FIG. 1C, data from an entity, such as the server 108-2, is segmented into a first portion and a second portion. The first portion is transferred to the client device 104-1 and the second portion is transferred to the client device 104-2. The client device 104-1 then shares the first portion with the client device 104-2 over the local area network 120, and the client device 104-2 shares the second portion with the client device 104-1 over the local area network 120.

Figure 1D:
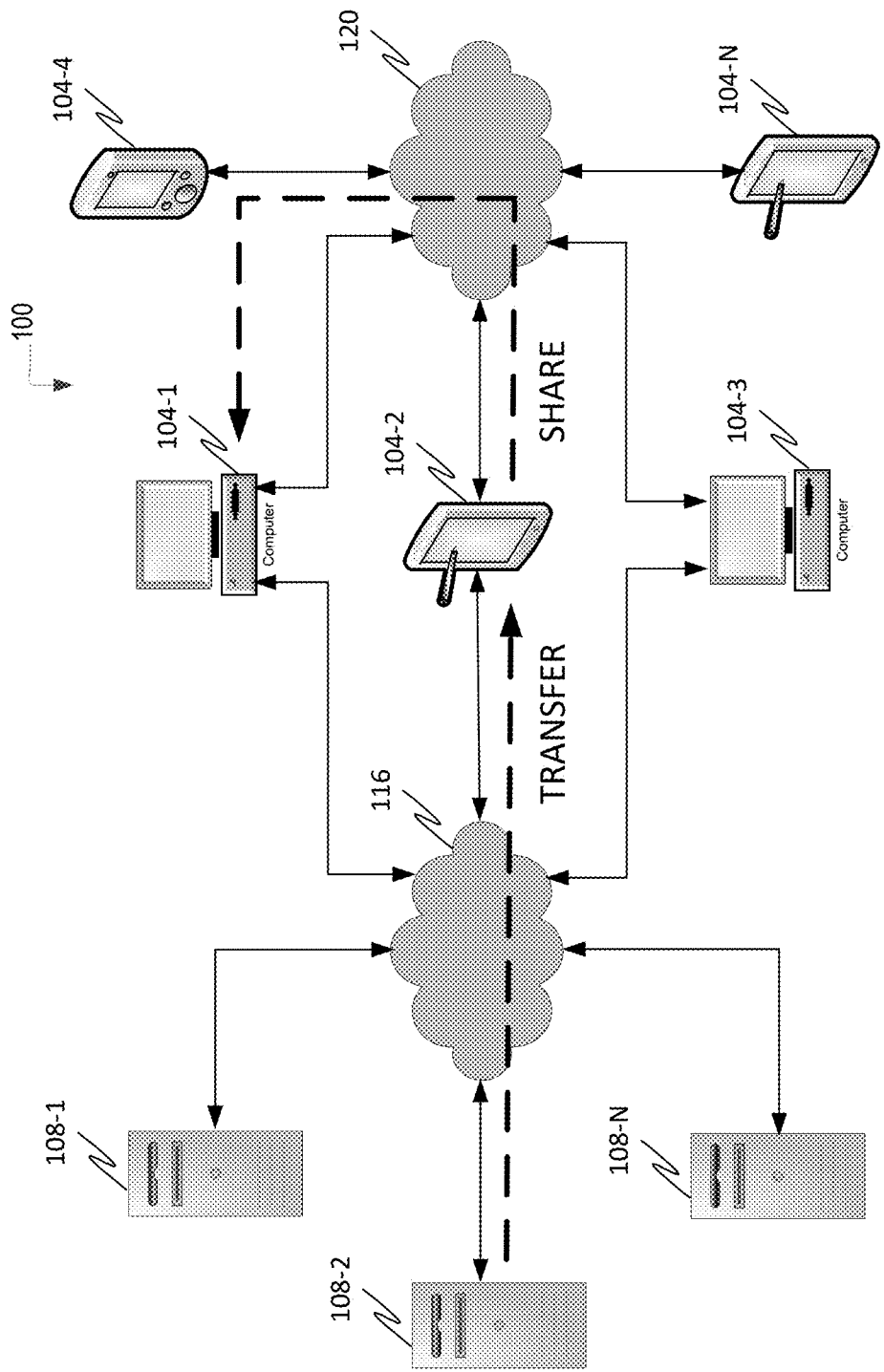
FIG. 1D is a block diagram of the example system illustrating a data transfer, and a delayed sharing of transferred content, in accordance with an example embodiment.

FIG. 1D is a block diagram of the example system 100 illustrating a data transfer and a delayed sharing of the transferred content, in accordance with an example embodiment. In the example of FIG. 1D, data from an entity, such as the server 108-2, is transferred to the client device 104-2 in response to a request for the transferred data. A subsequent request to transfer the data to the client device 104-1 is then issued. Since the content is located on the client device 104-2, the client device 104-2 transfer the content to the client device 104-1 over the local area network 120.

Figure 2:
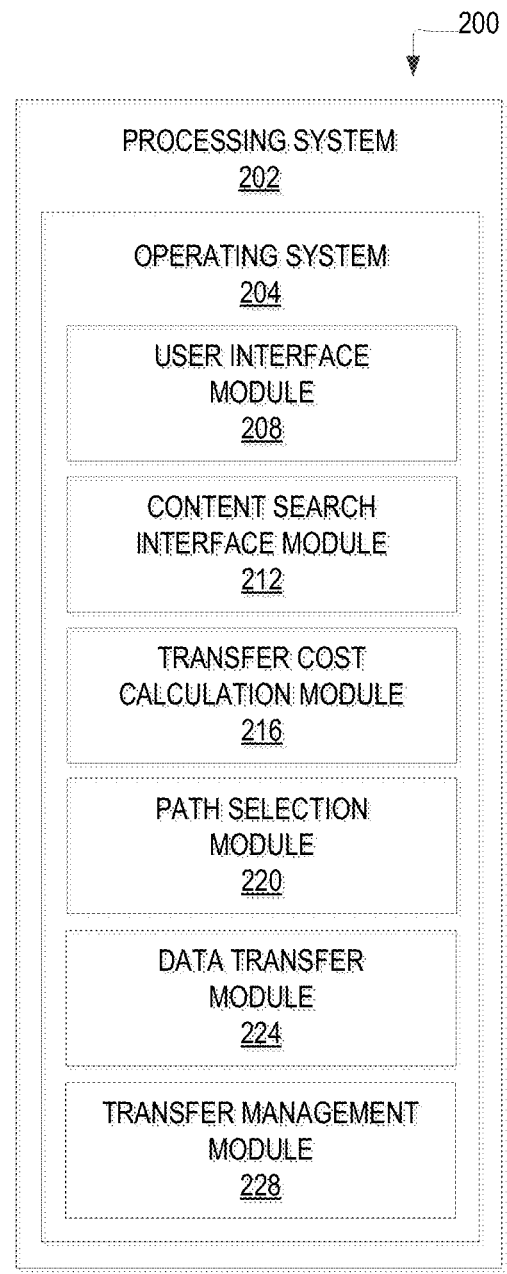
FIG. 2 is a block diagram of an example apparatus for transferring data, in accordance with an example embodiment.

FIG. 2 is a block diagram of an example apparatus 200 for transferring data, in accordance with an example embodiment. The apparatus 200 is shown to include a processing system 202 that may be implemented on a server, client, or other processing device that includes an operating system 204 for executing software instructions. In accordance with an example embodiment, the processing system 202 may include a user interface module 208, a content search interface module 212, a transfer cost calculation module 216, a path selection module 220, a data transfer module 224, and a transfer management module 228. In one example embodiment, the apparatus 200 may implement the client device 104.

The user interface module 208 provides an interface for searching for data content and initiating a data transfer. The content search interface module 212 conducts a search for data content on the servers 108, the client devices 104, and the like. The search may be conducted by searching a global index, searching a distributed index, polling the servers 108 and the client devices 104 for the data content, and the like.

The transfer cost calculation module 216 determines a transfer cost for transferring data over various paths that connect a sender and a recipient of data content. For example, the transfer costs maintained in the example client device data structure of FIG. 3A, as described more fully below by way of example, may be used to determine the transfer cost for transferring data over the various paths that connect a sender and a recipient.

The path selection module 220 determines one or more paths to each recipient of the data content and selects one or more paths for transferring data. The path selection may be based on defined transfer cost optimization criteria and an overall transfer cost provided by the transfer cost calculation module 216. In one example embodiment, the path selection module 220 is instructed by a path selection module 220 of another entity (such as another server 108, the client device 104, and the like) of the path to use for transferring data content.

The data transfer module 224 transfers data via one or more paths identified by the path selection module 220. The data transfer module 224 may segment data into portions prior to transmission, may reassemble data received from a plurality of entities (e.g., the servers 108, the client devices 104), or both.

The transfer management module 228 manages the client devices 104 for transferring data content and manages the transfer of data content. The transfer management module 228 parses notifications that include information related to the presence and characteristics of a client device 104 and may maintain the client device data structure, the network data structure, and the priority queue data structure of FIGS. 3A, 3B, and 3C, respectively. The transfer management module 228 may prepare a client device 104 for transferring data.

Figure 3A:
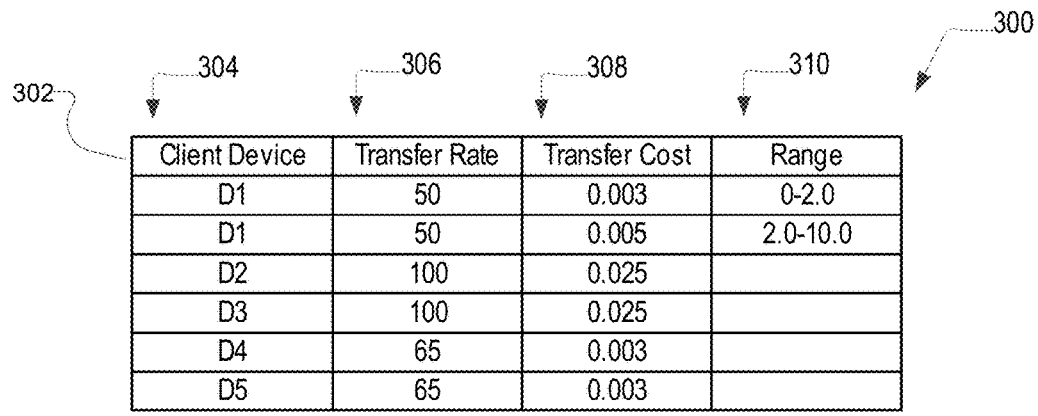
FIG. 3A is a representation of an example client device data structure for maintaining metadata on each client device, in accordance with an example embodiment.

FIG. 3A is a representation of an example client device data structure 300 for maintaining metadata on each client device 104, in accordance with an example embodiment. In one example embodiment, the client device data structure 300 contains one or more rows 302 for each client device 104. Column 304 contains an identifier of a corresponding client device 104, column 306 contains a data transfer rate, column 308 contains a data transfer cost, and column 310 contains a data range that defines an amount of data that corresponds to the client device 104, data transfer rate, and data transfer cost of the corresponding row 302. For example, the data transfer cost is $0.003 per megabyte (MB) for the first 2.0 gigabyte (GB) of data and the data transfer cost is $0.005 per megabyte (MB) for the next 8.0 gigabyte (GB) of data.

Figure 3B:
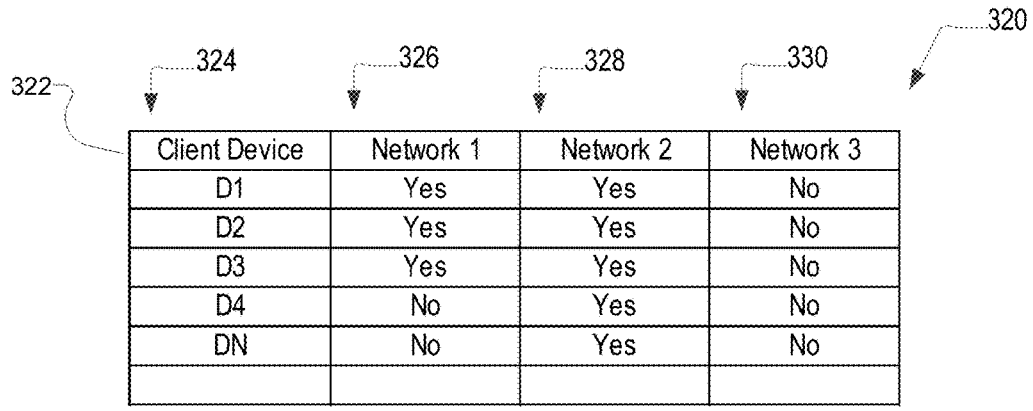
FIG. 3B is a representation of an example data structure for maintaining network metadata on each client device, in accordance with an example embodiment.

FIG. 3B is a representation of an example network data structure 320 for maintaining network metadata on each client device 104, in accordance with an example embodiment. In one example embodiment, the network data structure 320 contains a row 322 for each client device 104. Column 324 contains the identifier of the corresponding client device 104, column 326 contains an indication of whether the corresponding client device 104 is connected to a first network, column 328 contains an indication of whether the corresponding client device 104 is connected to a second network, and column 330 contains an indication of whether the corresponding client device 104 is connected to a third network. For example, client device 104-1 (D1) is connected to the first network and the second network, but not the third network.

Figure 3C:
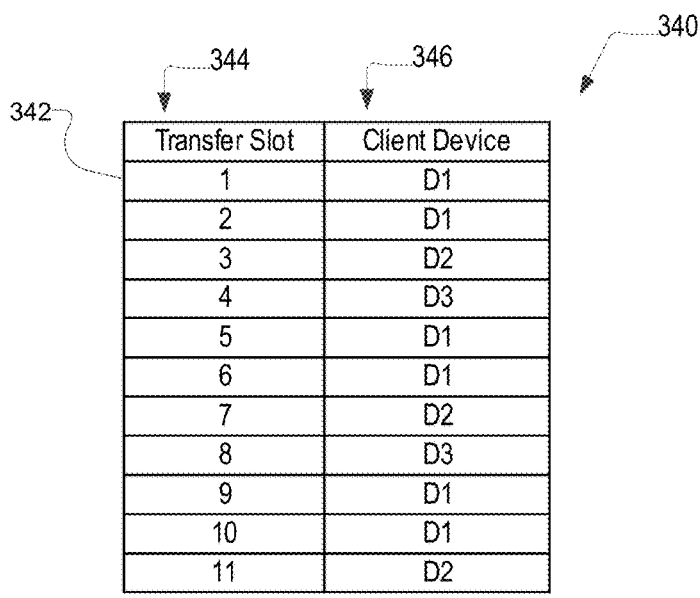
FIG. 3C is a representation of an example priority queue data structure for a priority queue, in accordance with an example embodiment.

FIG. 3C is a representation of an example priority queue data structure 340 for a priority queue, in accordance with an example embodiment. In one example embodiment, the priority queue data structure 340 contains a row 342 for each data transfer slot. Column 344 contains an identifier of a corresponding data transfer slot and column 346 contains an identification of the client device 104 that is scheduled to transfer the data packets of the corresponding data transfer slot.

Figure 4:
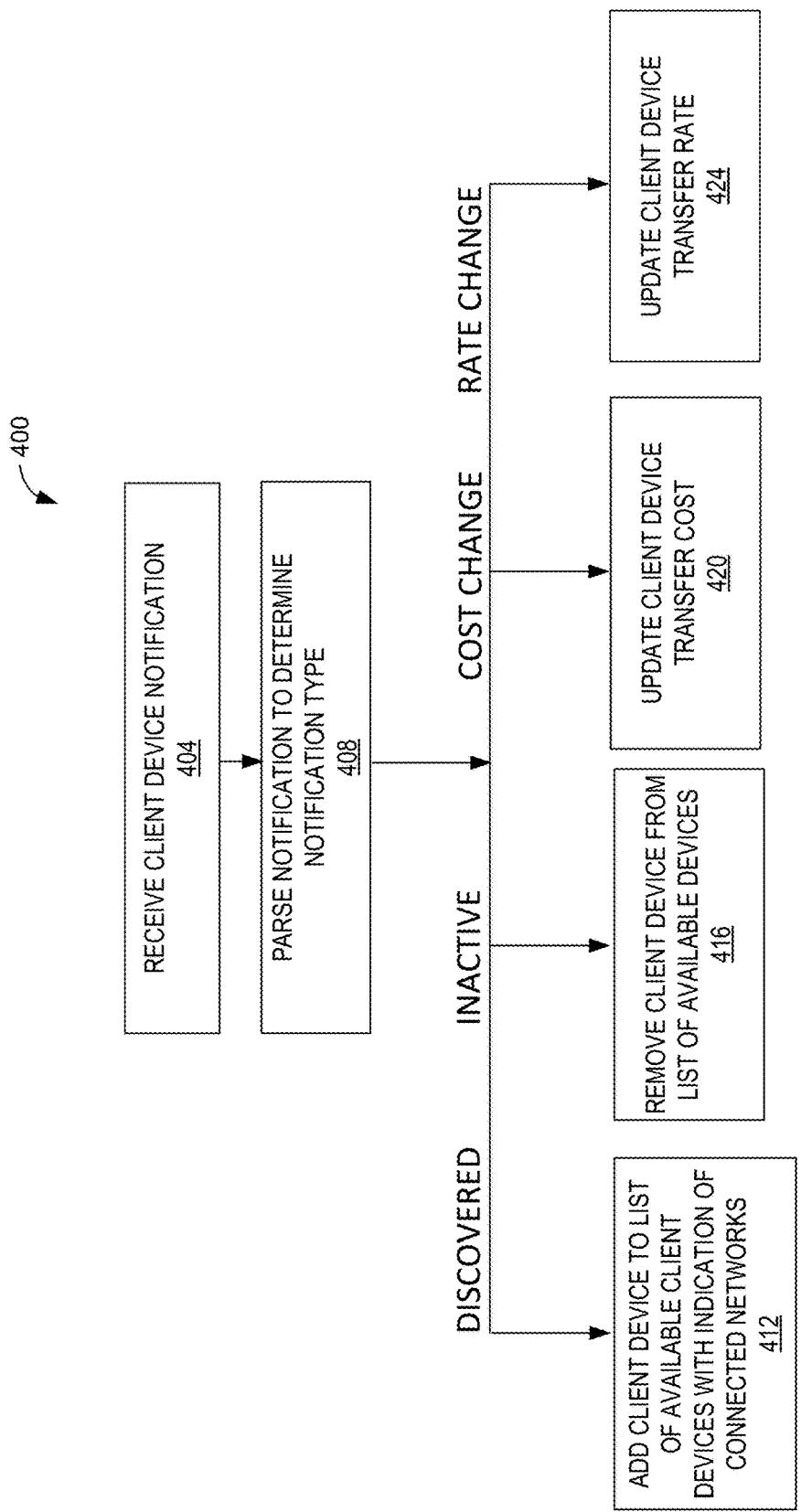
FIG. 4 is a flowchart for an example method for receiving a notification from a client device of the example system, in accordance with an example embodiment.

FIG. 4 is a flowchart for an example method 400 for receiving a notification from the client device 104, in accordance with an example embodiment. In one example embodiment, one or more of the operations of the method 400 may be performed by the transfer management module 228.

In one example embodiment, a notification from the client device 104 is received (operation 404). The notification includes information related to the presence and characteristics of a client device 104. The notification is parsed to determine a notification type (operation 408). If the notification indicates that a client device 104 has been discovered, the discovered client device 104 is added to a list of available client devices with an indication of the network(s) to which the discovered client device 104 is connected (such as the local area network 120) (operation 412). If the notification indicates that the client device 104 is no longer active, the client device 104 is removed from the list of available client devices (operation 416). If the notification indicates that a transfer cost of the client device 104 has changed, the transfer cost of the client device 104 is updated accordingly in the client device data structure 300 (operation 420). If the notification indicates that a transfer rate of the client device 104 has changed, the device transfer rate is updated accordingly in the client device data structure 300 (operation 424).

Figure 5:
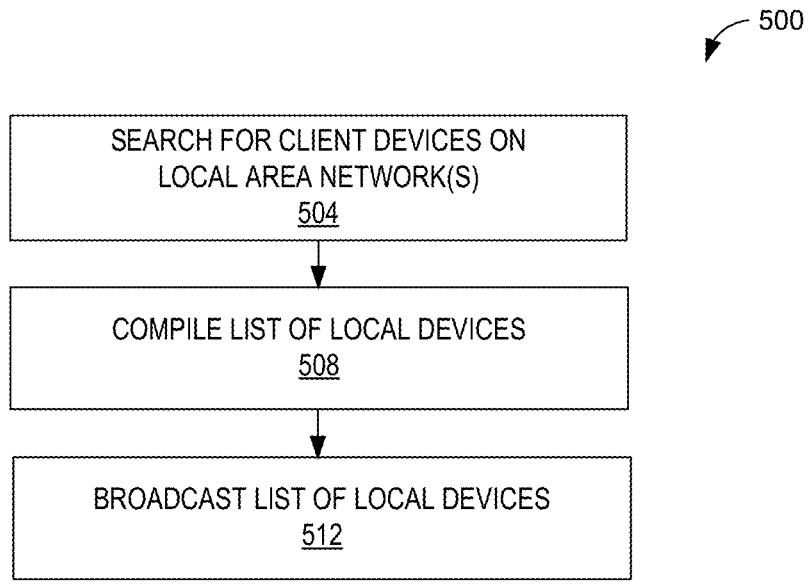
FIG. 5 is a flowchart for an example method for identifying local client devices of the example system, in accordance with an example embodiment.

FIG. 5 is a flowchart for an example method 500 for identifying local client devices 104, in accordance with an example embodiment. In one example embodiment, one or more of the operations of the method 500 may be performed by the content search interface module 212 or the transfer management module 228.

In one example embodiment, a search for client devices 104 on a network(s), such as the first network 116, the local area network 120, or both is conducted (operation 504). For example, a beacon transmitted by a client device 104 may be monitored, a client device 104 may be pinged for status information (such as activity status and transfer rate), and the like. A list of discovered client devices 104, a list of removed client devices 104, or any combination thereof (including, for example, the transfer cost and transfer rate corresponding to the client devices 104) are compiled (operation 508). The list is then broadcast (operation 512) to designated recipients, such as the transfer management module 228 and the client devices 104 and servers 108 that are responsible for transferring data content within the system 100.

Figure 6:
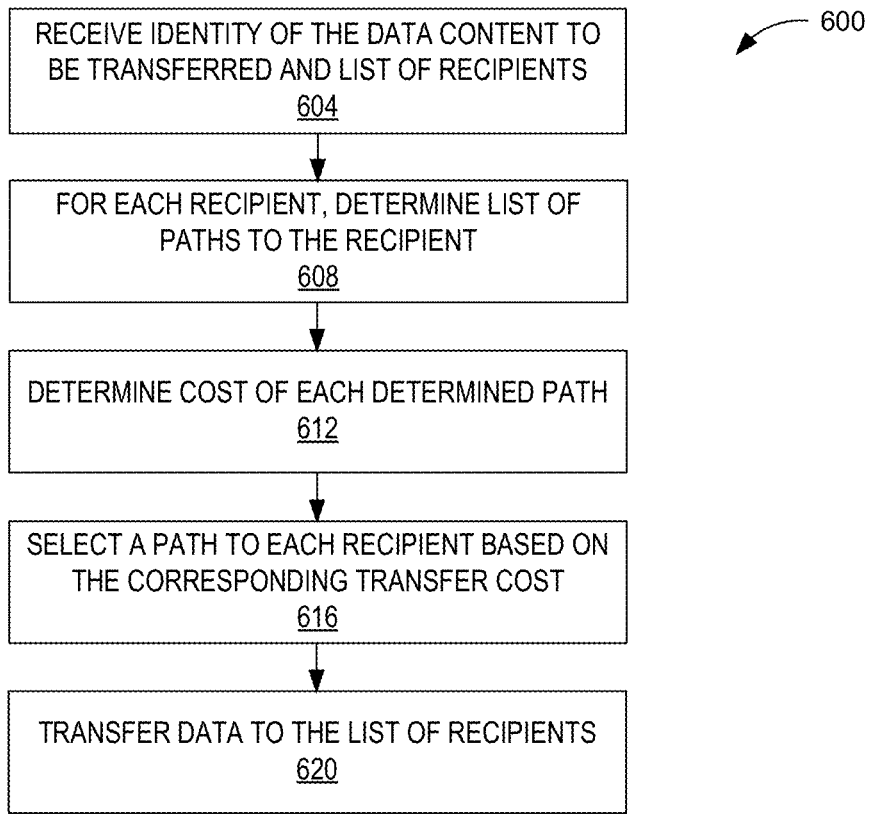
FIG. 6 is a flowchart for an example method for preparing a client device for transferring data, in accordance with an example embodiment.

FIG. 6 is a flowchart for an example method 600 for preparing a client device 104 for transferring data, in accordance with an example embodiment. In one example embodiment, one or more of the operations of the method 600 may be performed by the transfer management module 228.

In one example embodiment, the identity of the data content to be transferred and a list of recipients (e.g., the client devices 104) is received (operation 604). For example, a user of the client device 104 may provide the identity of the data content to be transferred and the list of recipients. For each recipient, a list of paths to the corresponding recipient is determined (operation 608). For example, the path selection module 220 may determine the one or more paths from the senders to each recipient (e.g., the client device 104).

For each determined path, an overall transfer cost associated with the path is determined (operation 612). For example, the transfer cost calculation module 216 may calculate the transfer cost associated with the path. The identity of the client device(s) 104 which are local to the recipient is determined and the characteristic of each client device 104 is obtained, including the transfer cost, the transfer rate, and the like. A transfer cost function may be used to compute the overall transfer cost. For example, the function $a*C_i+b*S_i$ may be used as the transfer cost function where a and b are configurable weights, $C_i$ is the cost involved to transmit a packet to client device 104-$i$, and $S_i$ is the rate of data transfer to client device 104-$i$. It is noted that the cost to transmit a packet may be larger, in absolute terms, than the rate of data transfer or vice versa. In order to prevent one of the parameters from dominating the other in the transfer cost function, the cost to transmit a packet and the rate of data transfer may be normalized to a maximum value of one based on the maximum cost to transmit a packet of the candidate client devices 104 and the maximum rate of data transfer of the candidate client devices 104, respectively, prior to applying the weights. The candidate client devices 104 are the client devices 104 that are being considered to participate in the data transfer.

The weights may be predefined or may be user-selectable. The weights may be set at the platform level or at the application level. The weights may be selected, for example, to favor the transmission cost (e.g., a=0.25 and b=0.75), to favor the transfer rate (e.g., a=0.75 and b=0.25), or to equally favor transmission cost and transfer rate (e.g., a=0.50 and b=0.50).

A path to each recipient is selected based on the associated overall transfer cost and defined optimization criteria (operation 616). The optimization criteria may be defined, for example, by a user and may include minimal network cost, minimal transfer time, minimal cost for a particular participant of the data transfer, minimal cost for a particular recipient of the transfer, and the like.

The data is transferred to the recipients on the list of recipients (operation 620). The data transfers may occur simultaneously, sequentially, or both. The data transfer may include an indication of whether the data is to be passed through to another recipient and, if so, whether the data is to be pushed or pulled to the next recipient on the list.

In one example embodiment, a prioritized queue containing the identifiers of the client devices 104 to be utilized in receiving or forwarding packets of the content to be distributed is created. An identifier of a client device 104 is removed from the priority queue, a packet (from a transmission queue) is transmitted to the corresponding client device 104 and, upon receipt of a message from the client device 104 acknowledging the successful reception of the packet, the identifier of the corresponding client device 104 is returned to the queue for a future transmission. If a packet is not acknowledged within a defined time period or if a negative acknowledgement is received (indicating that the reception of the packet was not successful), the packet is transmitted to the next client device 104 in the priority queue.

For example, assume there are eight packets (P1 . . . P8) to be transmitted and three client devices 104 (D1, D2, and D3). Assume D1 becomes nonresponsive when transmission of its packet started, D2 takes 10 milliseconds (ms) to receive a packet, D3 takes 6 ms to receive a packet, and that the retransmission limit of a packet is 25 ms. An example scenario is as follows:

Time=0 ms: Send P1 to D1, Send P2 to D2, and Send P3 to D3.

Time=6 ms: D3 acknowledges receiving P3; send P4 to D3;

Time=10 ms: D2 acknowledges receiving P2; send P5 to D2;

Time=12 ms: D3 acknowledges receiving P4; send P6 to D3;

Time=18 ms: D3 acknowledges receiving P6; send P7 to D3;

Time=20 ms: D2 acknowledges receiving P5; send P8 to D2;

Time=24 ms: D3 acknowledges receiving P7

Time=25 ms: P1 is marked for retry. Send P1 through D3.

Time=30 ms: D2 acknowledges receiving P8; Nothing more to transfer.

Time=31 ms: D3 acknowledges receiving P1; Transfer complete.

In one example embodiment, packets may be distributed to client devices 104 based on a weighted sum of the transfer rate and the transfer cost of each client device 104. For example, the sum of the transfer rate multiplied by a first weight and the transfer cost multiplied by a second weight may be computed for each device. As noted above, the transfer rate may be normalized based on the maximum transfer rate of the candidate client devices 104 and the transmission cost may be maximized based on the maximum transmission cost of the candidate client devices 104.

Figure 7:
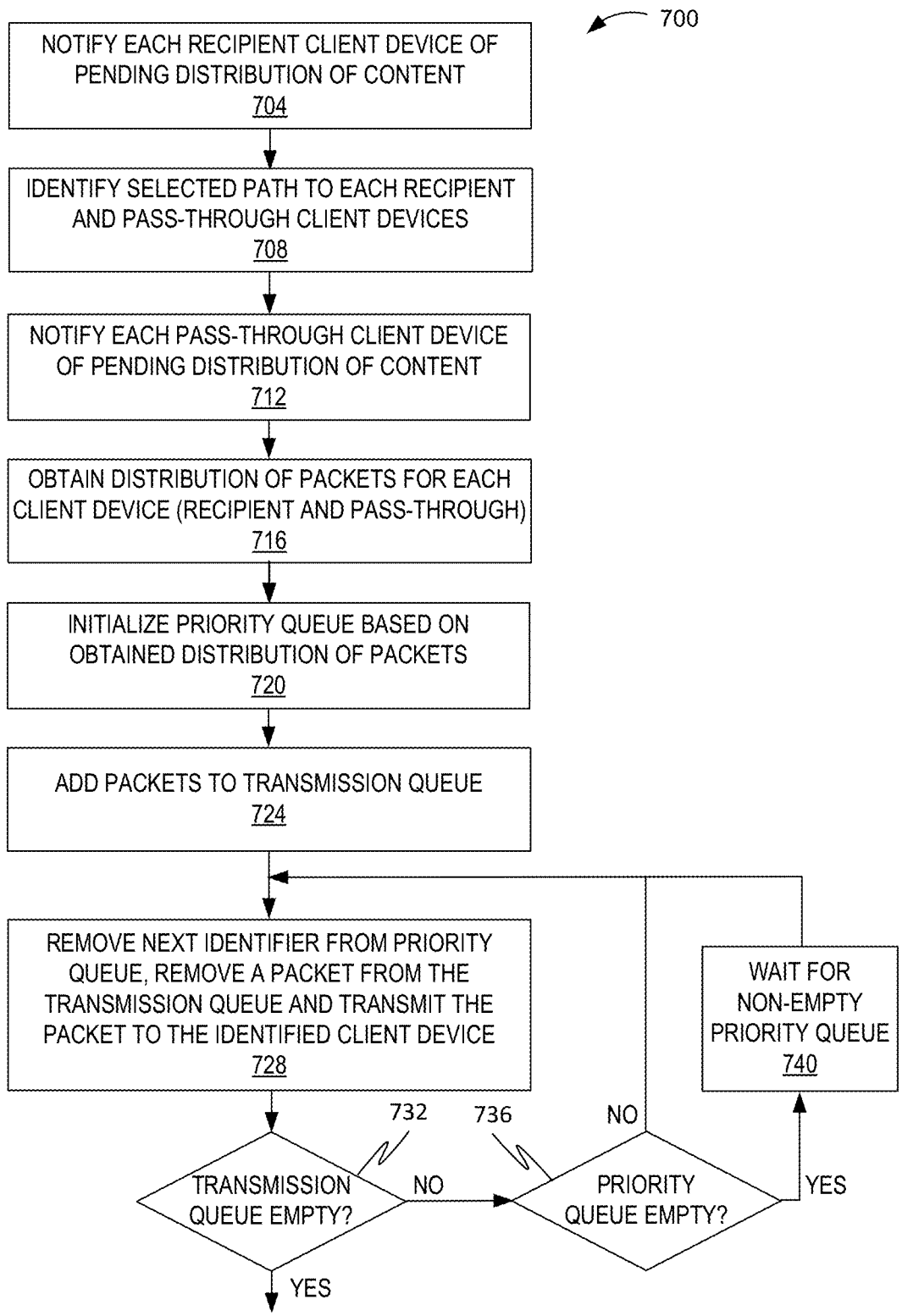
FIG. 7 is a flowchart for an example method for transferring data, in accordance with an example embodiment.

FIG. 7 is a flowchart for air example: method 700 for transferring data, in accordance with an example embodiment. In one example embodiment, one or more of the operations of the method 700 may be performed by the data transfer module 228.

In one example embodiment, each recipient client device 104 is notified of the pending distribution of content (operation 704). For example, metadata may be sent to the client device 104 to enable the client device 104 to prepare for the transfer of data content. The metadata may include a description of the data content, an indication of the size of the data content, an identity of the sender of the data content, an identity of the other recipient(s), if any, of the data content, the count of packets, and the like.

The identity of the selected path(s) to each recipient and the identity of any pass-through client devices 104 on the path(s) is obtained (operation 708). For example, a path selected during operation 616 of the method 600 may be identified. Each pass-through client device 104 (as identified, for example, by the path selected during operation 616 of the method 600) is notified of the pending distribution of data content (operation 712). For example, a message may be issued by the data transfer module 228 or the transfer management module 228 to the pass-through client device 104.

The initial distribution of packets to the client devices 104 is obtained (operation 716). The initial distribution of packets lists the client devices 104 which receive the data content from the sender (with no intervening pass-through client device 104).

A priority queue of the identifiers of the client devices 104 is created based on the initial distribution of packets (operation 720); the number of identifiers placed in the queue for each client device 104 is based on the obtained distribution of packets. The distribution of packets may be based on the transfer cost, as described above, and, in one example, is inversely proportional to the transfer cost. The content is segmented into packets (if not already segmented into packets) and the packets are added to a transmission queue (operation 724).

The next client device identifier is removed from the priority queue, a packet is removed from the transmission queue, and the packet is transmitted to the identified client device 104 (operation 728).

A test is performed to determine if the transmission queue is empty (operation 732). If the transmission queue is empty, the method 700 ends; otherwise, a test is performed to determine if the priority queue is empty (operation 736). If the priority queue is non-empty, the method 700 proceeds with operation 728; otherwise, the method 700 waits for the priority queue to be non-empty (operation 740) and then proceeds with operation 728.

Figure 8:
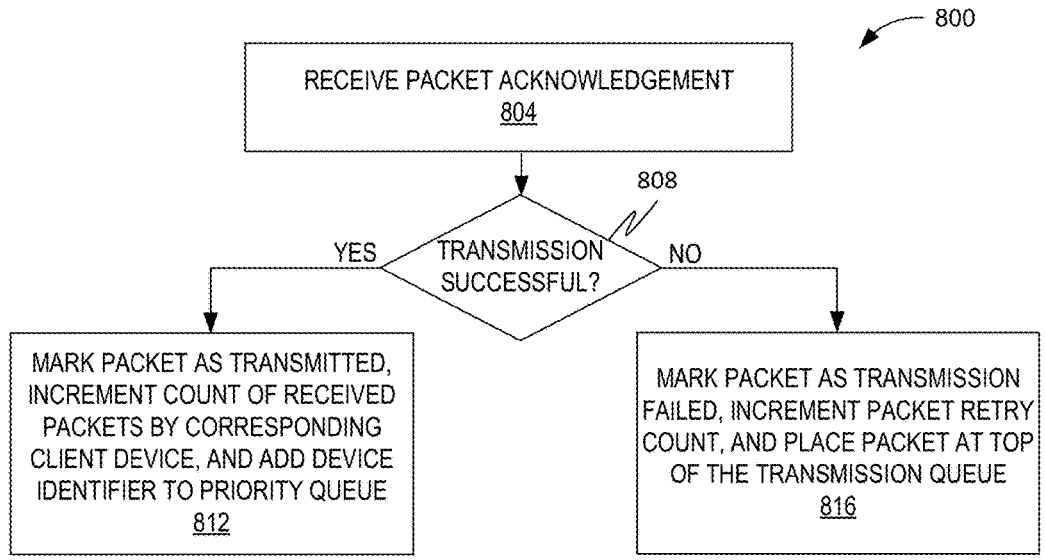
FIG. 8 is a flowchart for an example method for processing packet transfer acknowledgements, in accordance with an example embodiment.

FIG. 8 is a flowchart for an example method 800 for processing packet transfer acknowledgements, in accordance with an example embodiment. In one example embodiment, one or more of the operations of the method 800 may be performed by the data transfer module 224.

In one example embodiment, a packet acknowledgement is received (operation 804). A determination is made of whether the received packet acknowledgement indicates a successful transfer or an unsuccessful transfer (operation 808). If the packet was received successfully, the packet is marked as transmitted, a count of packets received by the corresponding client device 104 is incremented, and an identifier of the corresponding transmitting client device 104 is added to the priority queue (stored in the priority queue data structure 340) for a future transmission (operation 812); otherwise, the packet is marked as transmission failed, the retry count for the packet is incremented, and the packet is placed at the top of the transmission queue (operation 816).

Figure 9:
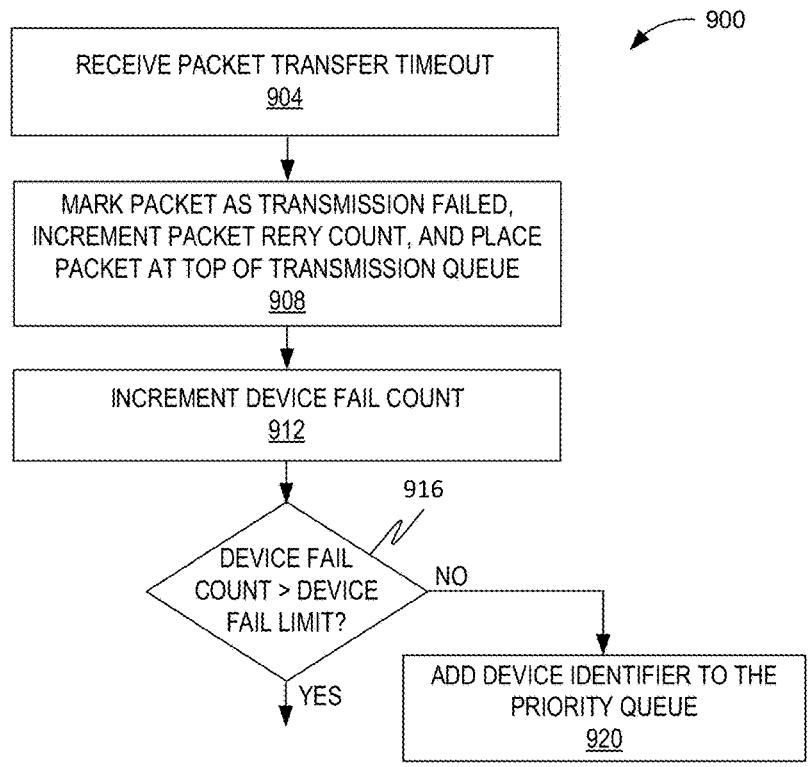
FIG. 9 is a flowchart for an example method for processing packet transfer timeouts, in accordance with an example embodiment.

FIG. 9 is a flowchart for an example method 900 for processing packet transfer timeouts, in accordance with an example embodiment. In one example embodiment, one or more of the operations of the method 900 may be performed by data transfer module 224.

In one example embodiment, a packet transfer timeout is received (operation 904). The packet is marked as transmission failed, a retry count for the packet is incremented, and the packet is placed at a top of the transmission queue (operation 908). The client device fail count is incremented (operation 912). A determination is made of whether the client device fail count exceeds the device fail limit (operation 916), The client device fail count may be defined by a user and may be, for example, set to a count of three. If the client device fail count does not exceed the device fail limit, the identifier of the client device 104 is added to the priority queue (operation 920); otherwise, the method 900 ends.

Figure 10:
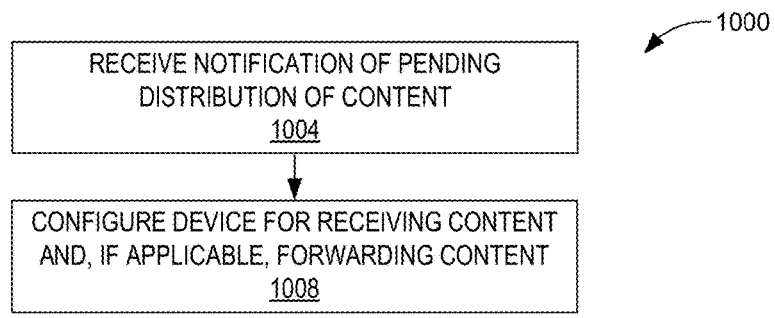
FIG. 10 is a flowchart for an example method for processing a notification of a pending distribution of content, in accordance with an example embodiment.

FIG. 10 is a flowchart for an example method 1000 for processing a notification of a pending distribution of content, in accordance with an example embodiment. In one example embodiment, one or more of the operations of the method 1000 may be performed by the transfer management module 228.

In one example embodiment, a notification of a pending distribution of data content is received by the client device 104 (operation 1004). The client device 104 is configured for reception, forwarding of the data content to another client device(s) 104, or both based on the notification (operation 1008). For example, storage for the data content may be provisioned and a list of client devices 104 to which the content is to be forwarded may be determined from the metadata in the notification.

Figure 11:
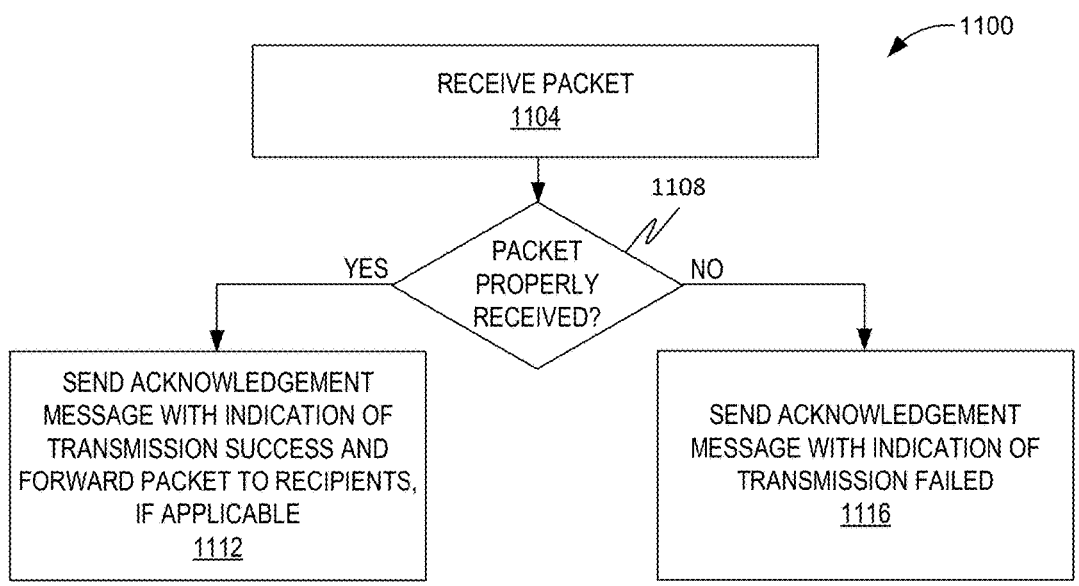
FIG. 11 is a flowchart for an example method for processing a received packet, in accordance with an example embodiment.

FIG. 11 is a flowchart for an example method 1100 for processing a received packet, in accordance with an example embodiment. In one example embodiment, one or more of the operations of the method 1100 may be performed by the data transfer module 224.

In one example embodiment, a packet is received (operation 1104). A determination is made of whether the packet was properly received (operation 1108). For example, an error correction code associated with a packet header, packet content, and the like may be verified. If the packet was properly received, an acknowledgement is sent to the sender of the packet with an indication of status of the packet (e.g., successfully received) (operation 1112). If the packet was successfully received, the packet is sent to the appropriate client devices 104 on the list of recipients associated with the data content transfer and to the local client device 104; otherwise, an acknowledgement is sent to the sender of the packet with an indication that the packet was not successfully received (operation 1116) and the method 1100 ends.

In one example embodiment, a recipient of a data content transfer reassembles the content from the received packets. If a packet has not been successfully received after a predefined timeout period, the packet is requested from other local recipients of the data content, if available. If the other local recipients are not available or are unable to provide the packet, the packet is requested from the originating sender.

Although certain examples are shown and described here, other variations exist and are within the scope of the invention. It will be appreciated, by those of ordinary skill in the art, that any arrangement, which is designed or arranged to achieve the same purpose, may be substituted for the specific embodiments shown. This application is intended to cover any adaptations or variations of the example embodiments of the invention described herein. It is intended that this invention be limited only by the claims, and the full scope of equivalents thereof.

Example Mobile Device

Figure 12:
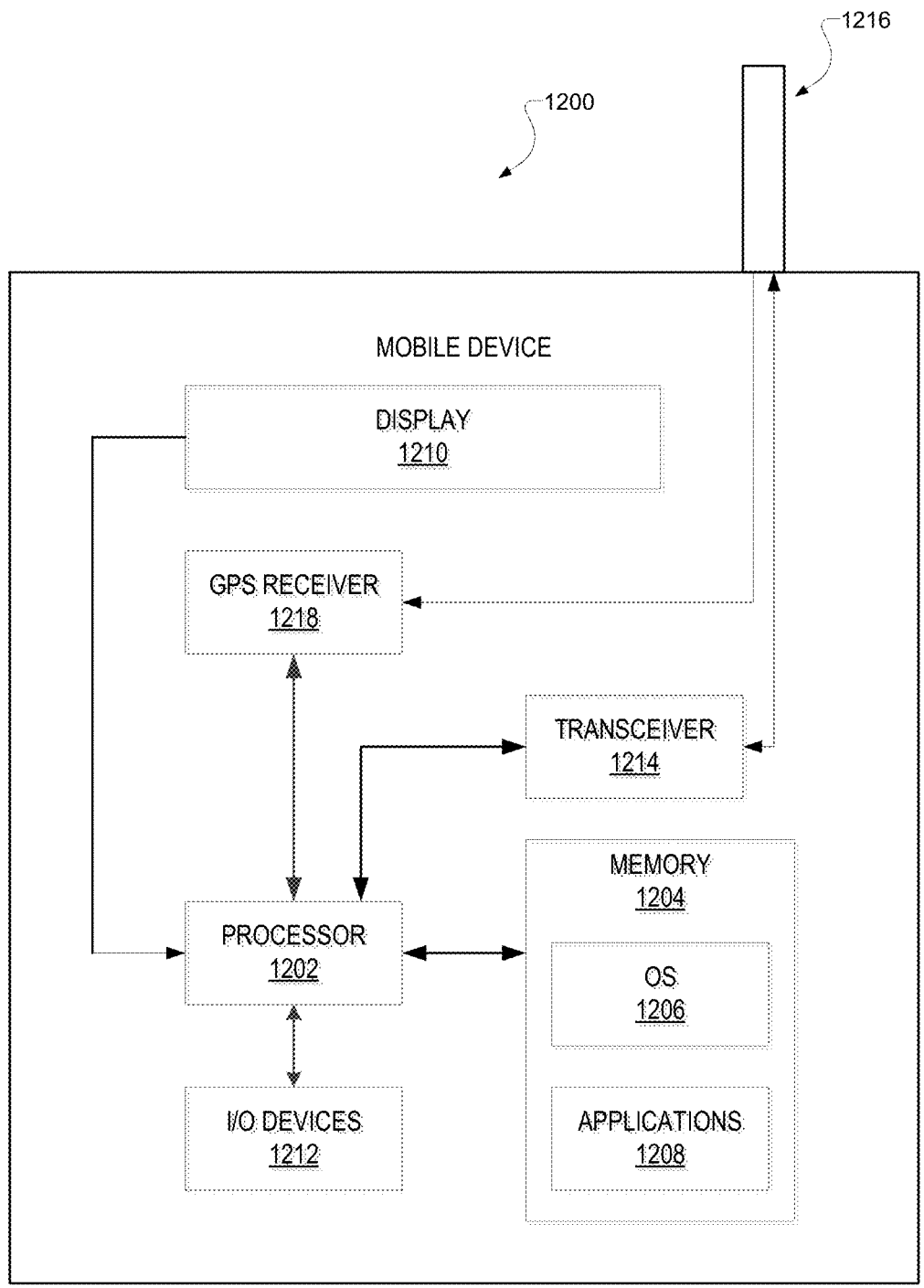
FIG. 12 is a block diagram illustrating an example mobile device, according to an example embodiment.

FIG. 12 is a block diagram illustrating an example mobile device 1200, according to an example embodiment. The mobile device 1200 may include a processor 1202. The processor 1202 may be any of a variety of different types of commercially available processors suitable for mobile devices (e.g., an XScale architecture microprocessor, a microprocessor without interlocked pipeline stages (MIPS) architecture processor, or another type of processor 1202). A memory 1204, such as a random access memory (RAM), a flash memory, or another type of memory, is typically accessible to the processor 1202. The memory 1204 may be adapted to store an operating system (OS) 1206, as well as application programs 1208, such as a mobile location-enabled application that may provide location-based services (LBSs) to a user. The processor 1202 may be coupled, either directly or via appropriate intermediary hardware, to a display 1210 and to one or more input/output (I/O) devices 1212, such as a keypad, a touch panel sensor, a microphone, and the like. Similarly, in some embodiments, the processor 1202 may be coupled to a transceiver 1214 that interfaces with an antenna 1216. The transceiver 1214 may be configured to both transmit and receive cellular network signals, wireless data signals, or other types of signals via the antenna 1216, depending on the nature of the mobile device 1200. Further, in some configurations, a GPS receiver 1218 may also make use of the antenna 1216 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiples of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs)).

Electronic Apparatus and System

Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Example Machine Architecture and Machine-Readable Medium

Figure 13:
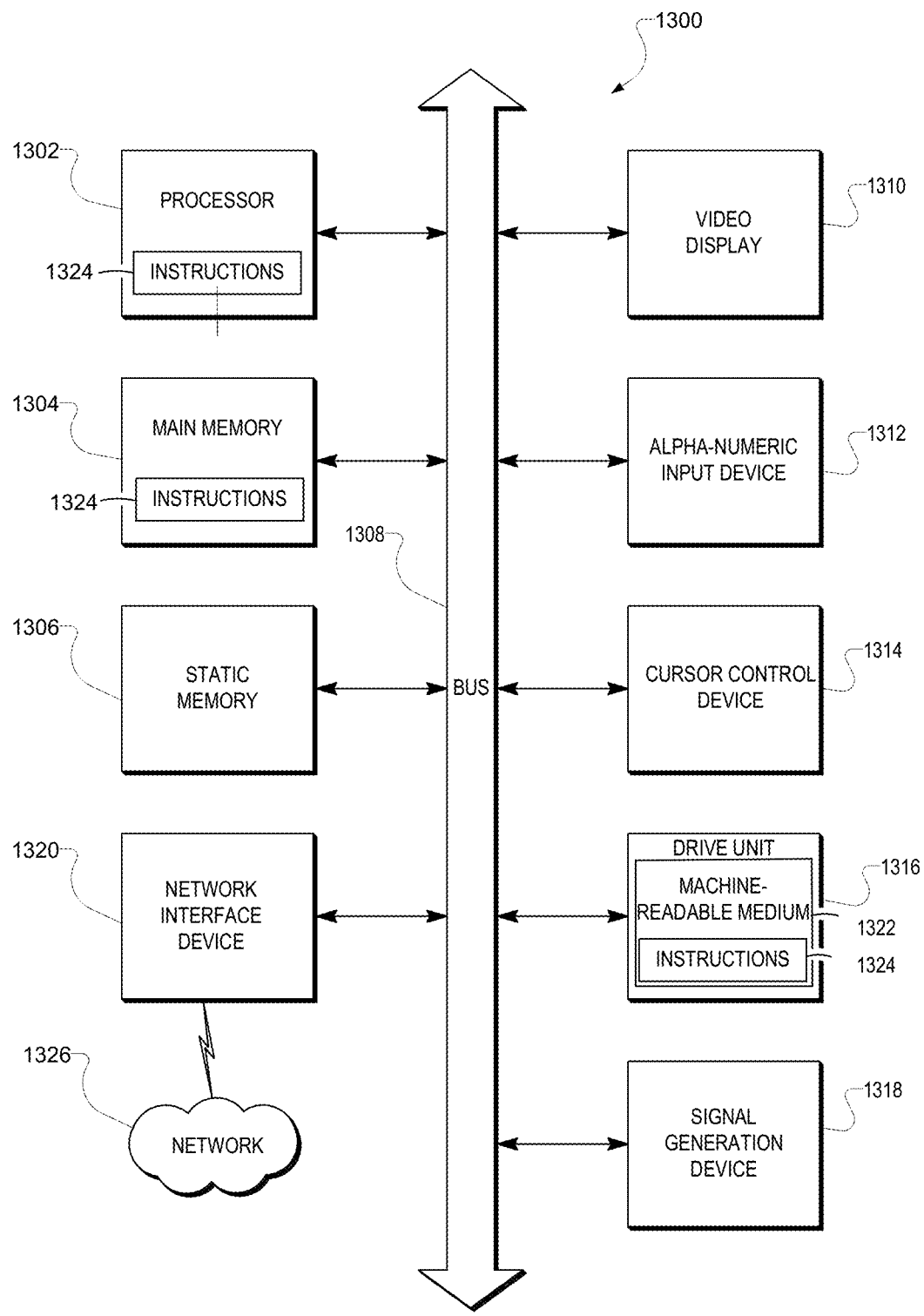
FIG. 13 is a block diagram of a machine within which instructions may be executed for causing the machine to perform any one or more of the methodologies discussed herein.

FIG. 13 is a block diagram of a machine in the example form of a computer system 1300 within which instructions may be executed for causing the machine to perform any one or more of the methodologies discussed herein. In one example embodiment, the machine may be the example apparatus 200 of FIG. 2 for transferring data. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1300 includes a processor 1302 (e.g., a central processing unit (CPU), a graphics processing unit (GPU), or both), a main memory 1304, and a static memory 1306, which communicate with each other via a bus 1308. The computer system 1300 may further include a video display unit 1310 (e.g., a liquid crystal display (LCD) or a cathode ray tube (CRT)). The computer system 1300 also includes an alphanumeric input device 1312 (e.g., a keyboard), a user interface (UI) navigation (or cursor control) device 1314 (e.g., a mouse), a disk drive unit 1316, a signal generation device 1318 (e.g., a speaker), and a network interface device 1320.

Machine-Readable Medium

The drive unit 1316 includes a machine-readable medium 1322 on which is stored one or more sets of data structures and instructions 1324 (e.g., software) embodying or utilized by any one or more of the methodologies or functions described herein. The instructions 1324 may also reside, completely or at least partially, within the main memory 1304 and/or within the processor 1302 during execution thereof by the computer system 1300, the main memory 1304 and the processor 1302 also constituting machine-readable media 1322. The instructions 1324 may also reside within the static memory 1306.

While the machine-readable medium 1322 is shown in an example embodiment to be a single medium, the term "machine-readable medium" may include a single medium or multiple media (e.g., a centralized or distributed database, and/or associated caches and servers) that store the one or more data structures or instructions 1324. The term "machine-readable medium" shall also be taken to include any tangible medium that is capable of storing, encoding, or carrying the instructions 1324 for execution by the machine and that cause the machine to perform any one or more of the methodologies of the present invention, or that is capable of storing, encoding, or carrying data structures utilized by or associated with such instructions 1324. The term "machine-readable medium" shall accordingly be taken to include, but not be limited to, solid-state memories, and optical and magnetic media. Specific examples of machine-readable media 1322 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

A "machine-readable medium" may refer to a single storage apparatus or device, as well as cloud-based storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof. In some embodiments, a "machine-readable medium" may also be referred to as a "machine-readable storage device."

Furthermore, the machine-readable medium 622 is non-transitory in that it does not embody a propagating or transitory signal. However, labeling the machine-readable medium 622 as "non-transitory" should not be construed to mean that the medium is incapable of movement—the medium should be considered as being transportable from one physical location to another. Additionally, since the machine-readable medium 622 is tangible, the medium may be considered to be a machine-readable storage device.

Transmission Medium

The instructions 1324 may further be transmitted or received over a communications network 1326 using a transmission medium. The instructions 1324 may be transmitted using the network interface device 1320 and any one of a number of well-known transfer protocols (e.g., hypertext transfer protocol (HTTP)). Examples of communications networks 1326 include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying the instructions 1324 for execution by the machine, and includes digital or analog communications signals or other intangible media to facilitate communication of such instructions 1324.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus for transferring data, the apparatus comprising:
    one or more hardware processors;
    memory to store instructions that, when executed by the one or more hardware processors, cause the one or more hardware processors to perform operations comprising:
        determining one or more paths from a server to a first client device and from the server to a second client device; and
        transferring a packet of data using the one or more paths, wherein transferring the packet of data includes:
            splitting the packet of data into a plurality of portions including a first portion and a second portion,
            sending the first portion to the first client device and the second portion to the second client device, and
            when the first client device and the second client device are coupled via the local network, causing the first portion to be transmitted from the first client device to the second client device via the local network.

2. The apparatus of claim 1, wherein, when the first client device and the second client device are coupled via the local network, transferring the packet of data includes:
    transferring the packet of data to the second client device via the first client device, wherein the first client device is a pass-through client device.

3. The apparatus of claim 1, the operations further comprising:
    causing the second portion to be transmitted from the second client device to the first client device via the local network.

4. The apparatus of claim 1, wherein a size of the first portion is based on an overall transfer cost of a path to the first client device and a size of the second portion is based on an overall transfer cost of a path to the second client device.

5. The apparatus of claim 4, wherein the overall transfer cost is based on one or more of a cost for transferring the data over a network of a service provider, an amount of time needed to transfer the data, or an amount of available data transfer capacity.

6. The apparatus of claim 1, the operations further comprising:
    initializing a priority queue with one or more client device identifiers;
    removing a next client identifier from the priority queue;
    sending a packet to a client device corresponding to the next client identifier; and
    returning the next client identifier to the priority queue in response to receiving a reception acknowledgement for the packet, the reception acknowledgement indicating the packet was successfully received.

7. The apparatus of claim 6, the operations further comprising:
    receiving a packet transfer timeout;
    marking a transmitted packet as transmission failed;
    incrementing a retry count for the transmitted packet;
    placing the transmitted packet at a top of a transmission queue; and
    comparing a client device fail count and a device fail limit.

8. The apparatus of claim 7, the operations further comprising returning a client identifier corresponding to the transmitted packet to the priority queue in response to the client device fail count being less than the device fail limit.

9. The apparatus of claim 1, wherein transferring the packet of data using the one or more paths includes selecting the one or more paths, wherein selecting is optimized based on a minimal network cost, a minimal transfer time, a minimal cost for a sender of the packet of data, or a minimal cost for the first client device or the second client device.

10. A method for transferring data, the method comprising:
    determining one or more paths from a server to a first client device and from the server to a second client device; and
    transferring a packet of data using the one or more paths, wherein transferring the packet of data includes:
        splitting the packet of data into a plurality of portions including a first portion and a second portion,
        sending the first portion to the first client device and the second portion to the second client device, and
        when the first client device and the second client device are coupled via the local network, causing the first portion to be transmitted from the first client device to the second client device via the local network.

11. The method of claim 10, wherein, when the first client device and the second client device are coupled via the local network, transferring the packet of data includes:

transferring the packet of data to the second client device via the first client device, wherein the first client device is a pass-through client device.

12. The method of claim 10, the operations further comprising:
causing the second portion to be transmitted from the second client device to the first client device via the local network.

13. The method of claim 10, wherein a size of the first portion is based on an overall transfer cost of a path to the first client device and a size of the second portion is based on an overall transfer cost of a path to the second client device.

14. The method of claim 13, wherein the overall transfer cost is based on one or more of a cost for transferring the data over a network of a service provider, an amount of time needed to transfer the data, or an amount of available data transfer capacity.

15. The method of claim 13, wherein transferring the packet of data using the one or more paths includes selecting the one or more paths, wherein selecting is optimized based on a minimal network cost, a minimal transfer time, a minimal cost for a sender of the packet of data, or a minimal cost for the first client device or the second client device.

16. The method of claim 10, the operations further comprising:
initializing a priority queue with one or more client device identifiers;
removing a next client identifier from the priority queue;
sending a packet to a client device corresponding to the next client identifier; and
returning the next client identifier to the priority queue in response to receiving a reception acknowledgement for the packet, the reception acknowledgement indicating the packet was successfully received.

17. The method of claim 16, the operations further comprising:
receiving a packet transfer timeout;
marking a transmitted packet as transmission failed;
incrementing a retry count for the transmitted packet;
placing the transmitted packet at a top of a transmission queue; and
comparing a client device fail count and a device fail limit.

18. The method of claim 17, the operations further comprising returning a client identifier corresponding to the transmitted packet to the priority queue in response to the client device fail count being less than the device fail limit.

19. A non-transitory computer-readable medium including instructions that, when executed by a processor, perform operations comprising:
determining one or more paths from a server to a first client device and from the server to a second client device; and
transferring a packet of data using the one or more paths, wherein transferring the packet of data includes:
splitting the packet of data into a plurality of portions including a first portion and a second portion,
sending the first portion to the first client device and the second portion to the second client device, and
when the first client device and the second client device are coupled via the local network, causing the first portion to be transmitted from the first client device to the second client device via the local network.

20. The non-transitory computer-readable medium of claim 19, the operations further comprising:
initializing a priority queue with one or more client device identifiers;
removing a next client identifier from the priority queue;
sending a packet to a client device corresponding to the next client identifier; and
returning the next client identifier to the priority queue in response to receiving a reception acknowledgement for the packet, the reception acknowledgement indicating the packet was successfully received.

* * * * *